3,737,474
OLEFIN DIMERIZATION WITH NICKEL
COMPLEXES
Howard E. Dunn, Mount Vernon, Ind., assignor to
Phillips Petroleum Company
No Drawing. Filed Dec. 11, 1969, Ser. No. 884,351
Int. Cl. C07c 3/10
U.S. Cl. 260—683.15 D        9 Claims

ABSTRACT OF THE DISCLOSURE

An olefin is dimerized by contact with a catalyst formed from an organoaluminum compound and a nickel complex of a polymer such as poly(2-vinylpyridine).

---

This invention relates to a method for the dimerization of olefins. In another aspect, the invention relates to a method for the dimerization of olefins in the presence of a catalyst formed from an organoaluminum compound and a solid nickel complex.

Many processes have been developed for olefin dimerization. However, few of the processes have provided catalysts having high activity and high selectivity for the production of olefin dimers and yet are easily separable from the dimerization reaction mixture.

Therefore, it is an object of this invention to provide a method for the dimerization of olefins.

It is another object of this invention to provide catalysts for the production of olefin dimers.

Other objects, advantages and features of my invention will be apparent to one skilled in the art from the following disclosure and claims.

I have found that $C_2$ to $C_{12}$ acyclic and cyclic olefins can be dimerized according to the process of this invention by contacting the olefin with a catalyst formed by the admixture of (1) an organoaluminum compound represented by the formula $R''_nAlX_m$ in combination with (2) a solid complex of nickel, as subsequently defined, where $R''$ is an alkyl, alkenyl, aryl, or cycloalkyl radical, or a combination thereof such as alkaryl or aralkyl radical, having from 1 to 12 carbon atoms, X is a halogen, $n$ can be an integer 1, 2 or 3, $m$ can be 0 or the integer 1 or 2, and the sum of $n$ and $m$ equals 3. I have further found that according to this invention, a catalyst formed by the admixture of the two components disclosed above has a high selectivity for the production of dimers of olefins.

Specific examples of the organoaluminum component of the catalyst system are: methylaluminum dichloride, dimethylaluminum chloride, diethylaluminum bromide, ethylaluminum dibromide, triethylaluminum, vinylaluminum diiodide, tributylaluminum, dibutylaluminum fluoride, phenylaluminum dibromide, benzylaluminum dichloride, 4-tolylaluminum dichloride, dodecylaluminum dibromide, and the like, and mixtures thereof such as methylaluminum sesquichloride. Presently preferred aluminum compounds are organoaluminum chlorides, particularly those containing radicals of the lower hydrocarbons such as methyl and ethyl.

The nickel complex component of the invention catalyst system is the coordination product of a nickel compound and a complexing solid polymer component.

The nickel compounds of the catalyst system are any of those which can be complexed with the complexing groups of the solid polymeric component. Specific examples of these nickel compounds are nickel salts of inorganic or organic acids, for example, nickel chloride, nickel bromide, nickel iodide, nickel acetate, nickel propionate, nickel nitrate, nickel sulfate, nickel phosphate, and the like. Also, suitable are nickel compounds which are already complexed such as the aquo, tertiary phosphine, pyridine, ether, cyano, and the like, complexes of nickel. When soluble complexes such as these are contacted with the polymeric component, they will, at least partially, form the nickel-polymer complex desired.

The solid complexing component is any polymeric solid, which is insoluble in the reaction mixture and which has a functional group capable of complexing with nickel. Preferably, such a polymer will contain repeating units such as

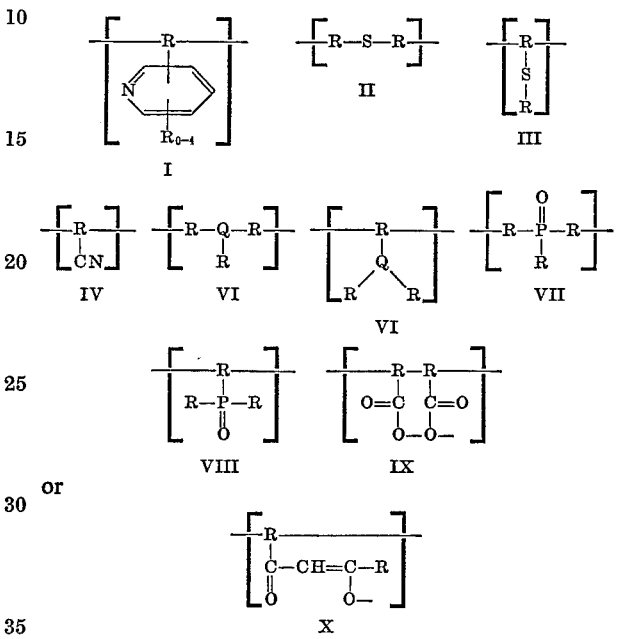

or wherein each R is an aromatic or aliphatic radical having up to about 12 carbon atoms, preferably a saturated aliphatic radical having from 1 to 5 carbon atoms; the R groups can be either mono-, di-, or tri-valent as indicated by the structural formulas; and Q is nitrogen, phosphorus, arsenic, or antimony.

The polymeric chain can be copolymerized, if desired, with other polymerizable hydrocarbon monomers such as ethylene, propylene, styrene, butadiene, as well as difunctional olefins such as divinylbenzene which act as crosslinking agents and which greatly increase the molecular weight of the polymer. However, the polymer can contain at least 75, preferably at least 90, percent by weight of the repeating units shown above. The polymer can have any molecular weight ranging from that which is just sufficient to make the material insoluble in hydrocarbon solvents under the reaction conditions up to several million depending upon whether crosslinking agents are employed.

The polymers described above can be conventionally prepared from corresponding monomers which contain the complexing functional groups. Thus, suitable monomers are those which, in addition to the complexing functional group, contain 1 or more polymerizable olefinic groups such as a vinyl group, a vinylidene group, an α-methylvinyl group and the like. Some suitable monomers are 2-vinylpyridine, 4-vinylpyridine, 3-allylpyridine, 4-vinylidenepyridine, 3 - isobutyl - 5 - vinylpyridine, di(3-butenyl)sulfide, ethylvinyl sulfide, acrylonitrile, 3-vinyl-5-dimethylaminotoluene, diethylallylamine, diphenylvinylarsine, cyclohexyldivinylstibine, dibenzylvinylphosphine oxide, maleic anhydride, 3,5-hexanedione-1-ene, 4-vinyl-1,2-benzene dicarboxylic acid, and the like and mixtures thereof. Such monomers can be contacted, under polymerization conditions, with free radical-producing catalysts, for example organic peroxides, azo-bis-alkylnitrile compounds or other conventional catalyst systems, including polymerizing irradiation, which have activity for polymerizing unsaturated monomers to solid polymers.

A preferred class of solid polymers are those prepared from monovinyl-substituted monocyclic pyridines containing a minor amount of polyvinyl-substituted aromatic compounds. This class of pyridine compounds is represented by

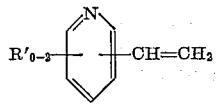

and the class of polyvinyl-substituted aromatic compounds represented by

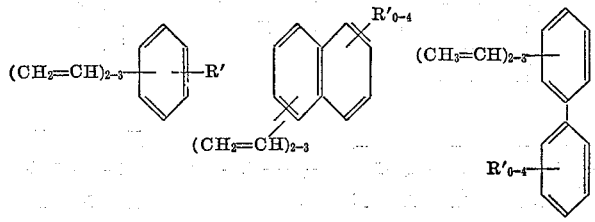

wherein each R' is an alkyl group containing from 1–4 carbon atoms and wherein the total number of carbon atoms in all the alkyl substituents of any molecule does not exceed 12.

Specific examples of the preferred pyridine compounds are 2-vinylpyridine, 3-vinylpyridine, 4-vinylpyridine, 2-methyl-5-vinylpyridine, 4-butyl-2-vinylpyridine, 3,5-dimethyl-2-vinylpyridine, 3-ethyl-5-propyl-4-vinylpyridine, and the like.

Specific examples of the polyvinyl-substituted aromatic compounds are 1,2-divinylbenzene, 1,4-divinylbenzene, 1,2,4-trivinylbenzene, 1,3-divinylnaphthalene, 2,4-divinylbiphenyl, 3,5,4'-trivinylbiphenyl, 1,2-divinyl-3,4-dimethylbenzene, 1,5,6-trivinyl-,3,7-diethylnaphthalene, 1,3-divinyl-4,5,8-tributylnaphthalene, 2,2'-divinyl-4-ethyl-4'-propylbiphenyl, and the like and mixtures thereof. Divinylbenzene is preferred, including commercial divinylbenzene which is a mixture of isomers. Other comonomers, such as styrene, ethylvinylbenzene, as well as those comonomers previously mentioned, can also be present.

The polymer can be in any shape or size. Preferably, the solid polymer is sufficiently finely divided to provide a fixed catalyst bed or slurry catalyst operation, but not so fine as to make it difficult to separate the catalyst from the product.

The nickel-polymer complex is formed by merely contacting the nickel compound with the polymer in the presence of a diluent in which the nickel compound is at least partially soluble. Such diluents are preferably non-aqueous and still more preferably are those non-aqueous diluents which cause some swelling of the polymer, thus improving the contacting of functional groups of the polymer with the nickel compound. Specific examples of such solvents are ethers, alcohols, glycol ethers hydrocarbons, halogenated hydrocarbons, and the like, including mixtures of such solvents. Some specific solvents are methanol, tetrahydrofuran, benzene, cyclohexane, chlorobenzene, ethylene dichloride, monomethyl ether of ethylene glycol, and the like.

The proportion of nickel compound used to contact the polymer will generally be that which is sufficient to form nickel complexes on from about 10 to about 100, preferably 10 to about 90 percent of the available sites on the solid polymer. The capacity of a given solid polymer to accept the nickel can vary, but can be readily determined by simple experimentation. For example, a solution of the nickel compound can be passed through a bed of the particulate polymer until the polymer is saturated. Analysis of the polymer or the effluent indicates the capacity of the polymer to accept and retain the nickel compound.

After the nickel compound is complexed with the solid polymer, it can be washed with additional solvent to displace non-complexed nickel or to displace one solvent with another. If desired, the complexed solid polymer can be dried by moderate heating under reduced pressure to remove the residual solvent and other volatiles.

The catalyst system of the invention can be formed by combining the ingredients in a number of ways. One method is to prepare the nickel-polymer complex as described above and then to contact the dried solid with a desired quantity of the organoaluminum compound. The organoaluminum compound is preferably applied in an inert solvent such as a hydrocarbon or halogenated hydrocarbon solvent. With or without the removal of the solvent, the aluminum nickel polymer complex can then be transferred to the reaction zone.

Another method of forming the catalyst system is to separately meter each of the three components, namely the nickel compound, the polymer, and the aluminum compound, into the reaction zone such that the solid catalyst composition is formed in situ.

Still another method of forming the catalyst system is to add the nickel compound and the organoaluminum compound to the solid polymer in the presence of a suitable diluent such that a slurry is formed. This slurry then can be pumped to the reaction zone of a batch-wise or continuous operation.

In still another method of forming the catalyst system, a slurry can be made from the solid polymer, the nickel compound, and a suitable solvent. The slurry then can be pumped into the reaction zone and contacted with the olefin before the addition of the organoaluminum compound. The components of the catalyst are usually combined in proportion in a range of 0.1 to 20, preferably about 1 to 10, moles of the organoaluminum compound per mole of nickel complexed to the polymer. Catalyst poisons in the system can be scavenged by employing even greater proportions of the organoaluminum component.

The dimerization can be carried out using a number of conventional contacting techniques. Thus, the solid catalyst system can be used as a mobile catalyst system either in the presence of a suitable solvent, as a catalyst slurry process, or in the absence of any diluent and in the gas phase, as a fluidized catalyst bed process. Any conventional contacting technique can be utilized for the olefin dimerization and batch-wise or continuous operation can be utilized.

If desired, the solid catalyst can be formed in a fixed catalytic bed through which the feed olefin can be passed either with or without a diluent.

The olefins to which the present dimerization process is directed include cyclic monoolefins having up to 12 carbon atoms per molecule and acyclic monoolefins having from about 2 to 12 carbon atoms, inclusive, where the acyclic monoolefin can be a terminal or internal olefin, branched or unbranched, but preferably has no branching nearer than the 3-position to the double bond. Examples of suitable monoolefins which can be used according to the present invention are ethylene, propylene, butene-1, butene-2, pentene-1, pentene-2, cyclopentene, cyclohexene, 3,4,5 - trimethylcyclohexene, 3 - methyl-butene-1, cycloheptene, hexene-2, heptene-1, cyclooctene, 4,4-dimethylheptene-2, decene-1, dodecene-1, and the like, and mixtures thereof. The presently preferred olefins are ethylene and propylene. Mixtures of olefin can be contacted with a catalyst to form "codimers;" for example, ethylene and butylenes react to form hexenes, propylene and butylenes react to form heptenes, etc.

The dimerization of the olefin or mixture of olefins can take place at temperatures within the range of −50 to 150° C., and preferably within the range of −10 to 100° C. Normally, it is desirable to carry out the dimerization reaction under pressures ranging from atmospheric up to 2000 p.s.i.g., preferably 20–500 p.s.i.g. The dimerization can be carried out in the presence of a diluent such as that used for the catalyst preparation desired. The time of contact of the olefin with the catalyst for the dimerization of the olefin will vary depending upon the desired degree of conversion but, generally, will be within the range from about 0.1 minute to 22 hours, preferably 5 to 120 minutes.

Ordinarily from about 0.00001 to about 0.1 mole of complexed nickel per mole of olefin feed is present in the reaction zone.

After completion of the reaction, or after removal of the effluent from the reaction zone, the catalyst of the present invention can be conveniently removed from the product by simple filtration or decantation. The catalyst can be recycled, if desired, back to the reaction zone either with or without a fortifying amount of the organoaluminum compound.

The dimers produced and the dimerization of olefins can be used for many purposes. For example, olefin dimers such as propylene dimers can be employed to make oxo alcohols which are used in the preparation of plasticizers such as for plasticizing polyvinyl chloride resins. Also, propylene dimers can be cracked by conventional methods to make isoprene.

The advantages of this invention are further illustrated by the following example. The reactants and their proportions and other specific conditions are presented as being typical and should not be construed to limit the invention unduly.

EXAMPLE I

Poly(2-vinylpyridine) powder was prepared at about 50–70° C. from a 90:10 by weight mixture of 2-vinylpyridine and commercial divinylbenzene using azo-bis-isobutyronitrile as a catalyst yielding a heavily crosslinked solid polymer having a molecular weight in excess of one million.

Two grams of this powder were added to a 125 milliliter flask. To this flask was also added 30 milliliters of ethylene glycol monomethyl ether. To another flask was added 0.24 gram of nickel dichloride hexahydrate and 15 milliliters of ethylene glycol monomethyl ether. When all of the nickel salt had dissolved, this solution was added to the flask with the polymer. It was then warmed with stirring for about 15 minutes and then filtered. The solid was then dried for four hours at 140° C. while at 0.1–0.25 mm. A dry dark blue powder was recovered.

A 0.5 gram quantity of the above-prepared nickel-complexed solid polymer was charged into a dry 7-ounce reaction flask together with 20 milliliters of chlorobenzene. Propylene was pressured in at 5 p.s.i.g. and 3 milliliters of a one molar solution of ethylaluminum dichloride and chlorobenzene was added. The reaction was allowed to proceed at essentially room temperature for about 45 minutes with stirring. An additional 3 milliliters of the ethylaluminum dichloride solution had been added after 10 minutes of the reaction period.

The reaction was stopped by the addition of 20 milliliters of water. The organic layer was decanted and distilled, yielding 18.3 grams of $C_6$ olefins. A sample of the olefin dimer product was hydrogenated and then analyzed by gas-liquid chromatography showing the presence of 69.0 weight percent 2-methylpentane, 26.8 weight percent n-hexane, 3.4 weight percent of 2,3-dimethylbutane, and 0.8 weight percent 3-methylpentane.

This run demonstrates that the solid catalyst system of this invention is very effective for the dimerization of propylene to hexenes.

Although this invention has been described in considerable detail, it must be understood that such detail is for the purpose of illustration only and that many variations and modifications can be made by one skilled in the art without departing from the scope and spirit thereof.

I claim:

1. A method for the dimerization of monoolefins having up to 12 carbon atoms per molecule which comprises admixing at least one said monoolefin, under dimerization conditions, with a catalyst system comprising (A) an organoaluminum compound having the formula $R''_n AlX_m$ wherein $R''$ is an alkyl, alkenyl, aryl, or cycloalkyl, radical, or combination thereof, having from 1 to 12 carbon atoms, X is a halogen, $n$ is 1, 2 or 3, $m$ is 0, 1 or 2, such that $n$ plus $m$ equals 3, and (B) a normally solid nickel complex, wherein said (B) normally solid nickel complex is the coordination product of a nickel compound and a complexing solid polymeric component, said nickel compound is a nickel salt of an inorganic or organic acid or a nickel compound complexed with a tertiary phosphine, pyridine, ether, or cyano compound, said complexing solid polymeric component is substantially hydrocarbon insoluble and is poly(2-vinylpyridine).

2. The method of claim 1 wherein said nickel compound is a nickel halide.

3. The method of claim 1 wherein said nickel compound is nickel dichloride and said organoaluminum compound is ethylaluminum dichloride.

4. The method of claim 1 wherein the dimerization is carried out at a temperature ranging from —50 to 150° C., at a pressure sufficient to maintain the material substantially in the liquid phase, for a time ranging from 0.1 minute to 22 hours, and in the presence of from 0.00001 to 0.1 mole of said nickel complex per mole of said monoolefin.

5. The method of claim 1 wherein said nickel compound and said polymer are admixed prior to contact with said organoaluminum compound and said olefin.

6. The method of claim 5 wherein said mixture of said nickel compound and said polymeric component is contacted with said olefin prior to contact with said organoaluminum compound.

7. The method of claim 1 wherein said polymeric components further contains copolymerized divinylbenzene.

8. The method of claim 7 wherein said polymeric component is polymerized with divinylbenzene and wherein the complexing solid substantially hydrocarbon insoluble polymeric component contains at least 90 percent by weight of said poly(2-vinylpyridine).

9. A proces according to claim 6 wherein said olefin is propylene, said polymer is poly(2-vinylpyridine) crosslinked with divinylbenzene, said nickel compound is nickel dichloride, and said organoaluminum compound is ethylaluminum dichloride.

References Cited

UNITED STATES PATENTS

| | | | |
|---|---|---|---|
| 3,379,706 | 4/1968 | Wilke | 260—683.15 X |
| 3,482,001 | 12/1969 | Eberhardt | 260—683.15 |
| 3,485,881 | 12/1969 | Zuech | 260—683.15 |
| 3,511,891 | 5/1970 | Taylor et al. | 260—683.15 |
| 3,152,088 | 10/1964 | Sandri et al. | 252—429 |
| 3,165,557 | 1/1965 | Coover et al. | 260—683.15 |
| 3,185,718 | 5/1965 | Brown et al. | 260—439 |
| 3,355,439 | 11/1967 | Welch et al. | 260—429 X |
| 3,558,517 | 1/1971 | Hughes et al. | 252—429 |
| 3,558,518 | 1/1971 | Zuech | 252—429 |
| 3,592,869 | 7/1971 | Cannell | 260—683.15 |
| 3,553,181 | 1/1971 | Delboville et al. | 260—80.78 |
| 3,642,760 | 2/1972 | Baekelmans et al. | 260—94.3 |
| 3,655,810 | 4/1972 | Chauvin et al. | 260—683.15 D |

PAUL M. COUGHLAN, JR., Primary Examiner

U.S. Cl. X.R.

252—429 B; 260—666 A